April 14, 1953     D. W. QUIRK     2,635,170
HEATED RECEPTACLE FOR HYGROSCOPIC MATERIALS
Filed Aug. 31, 1951
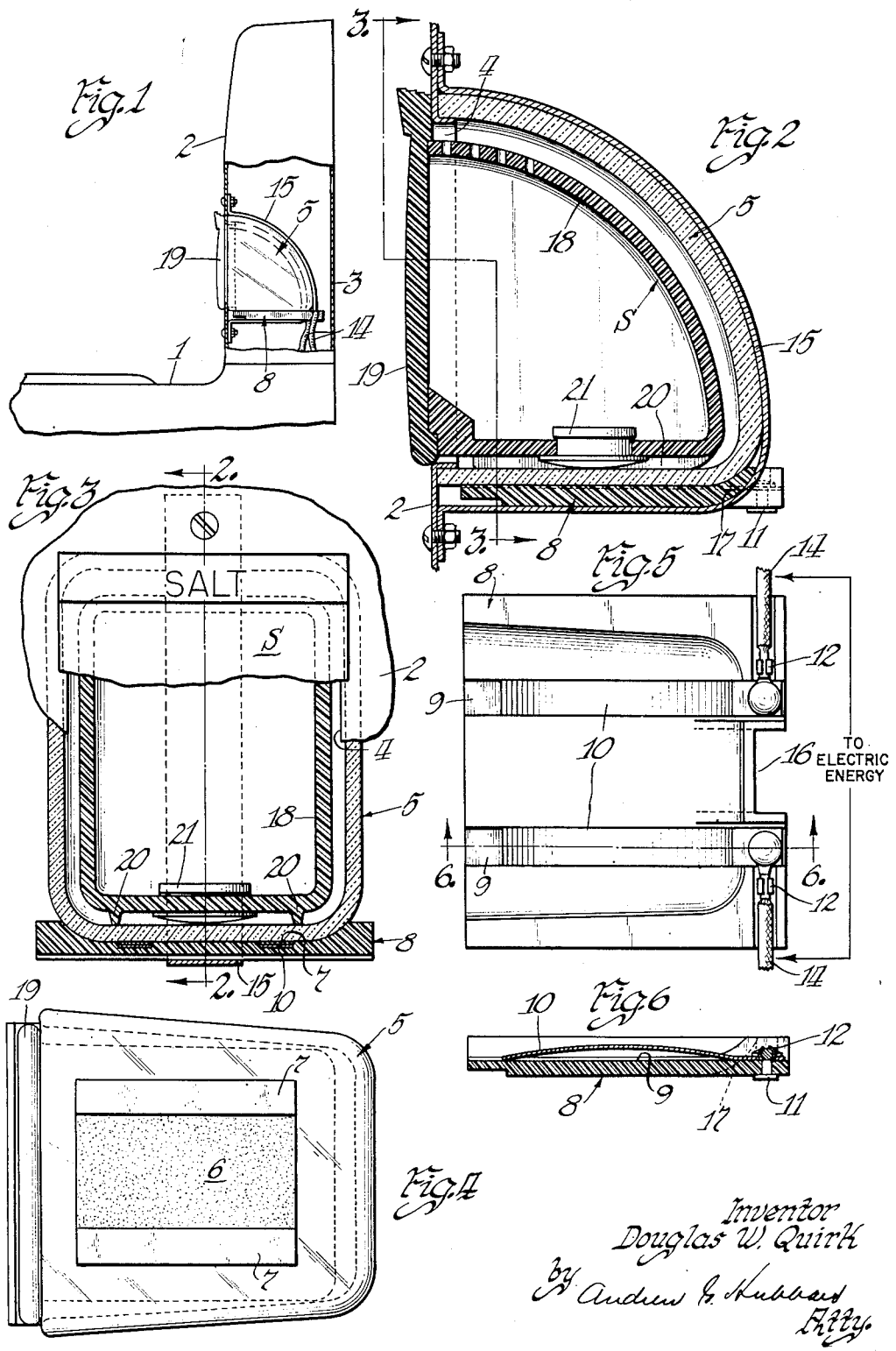
Inventor
Douglas W. Quirk
by Andrew G. Hubbard
Atty.

Patented Apr. 14, 1953

2,635,170

UNITED STATES PATENT OFFICE 2,635,170

HEATED RECEPTACLE FOR HYGROSCOPIC MATERIALS

Douglas W. Quirk, Chicago, Ill., assignor to General Electric Company, a corporation of New York Application August 31, 1951, Serial No. 244,529

5 Claims. (Cl. 219—19)

This invention relates to an improved heated receptacle for the storage of containers of hygroscopic material such as table salt, sugar, and the like, which upon absorption of moisture from the normal atmosphere become lumpy or caked and are made difficultly useable thereby.

It is an object of the invention to provide a storage receptacle having an improved heating element and means for connecting the heating element into an electric circuit.

It is a further object of the invention to provide a heated receptacle and terminal block which may be readily affixed to a supporting structure such as an element of a cooking range or the like.

It is still another object of the invention to provide an improved receptacle for housing a salt shaker or the like to maintain the salt in free-flowing condition.

It is becoming common for the manufacturers of cooking ranges to include salt and pepper shakers as standard equipment, and often the shakers are housed in suitable compartments provided in the upstanding rear wall or backsplasher of the range. It is desirable to place the salt shaker in a warm atmosphere and hence it would appear expedient to locate the chamber for the shakers adjacent the cooking units of the range; but because elevated temperatures will drive off the aromatic oils of pepper, it is the practice to place both chambers at a cool part of the range. In such a location ordinary room humidity, possibly increased by vapors emanating from food being cooked on the range, may be absorbed by the salt with resultant lumping or hardening.

Although my invention may be used for storing containers of any type of material, and is not limited to any particular size or shape, I have selected a receptacle for a salt shaker as a typical use to which my invention may be put. The receptacle is made part of the equipment of a cooking range, and space within the range backsplasher is adapted for mounting the receptacle, for example, by providing an inwardly flanged opening in the backsplasher in suitable relation to which the mouth of the receptacle may be secured. The receptacle is preferably made of glass or other vitreous material, although it may be of drawn metal having a vitreous enamel coating. On one wall surface thereof I apply an electrical resistance element; for example, a coating of electrically conductive material such as stannic chloride, disposed uniformly over an area suitable to raise the temperature of the interior of the receptacle to a desired degree. Preferably, the resistance material is applied to a portion of the bottom of the receptacle for reasons presently explained. A salt shaker placed within the receptacle will derive heat therefrom and the contents of the shaker remain dry and flowable.

It is, of course, a convenience to have the salt and pepper shakers placed close together; and hence I may elongate the backsplasher opening to accommodate receptacles for both, with a suitable trim plate or equivalent between them to close the otherwise visible opening. The pepper receptacle must remain unheated and its walls, plus the air space between said walls and the walls of the pepper shaker itself, provide sufficient thermal insulation to prevent the temperature of the pepper from rising to a detrimental level.

The above-named objectives and advantages of my invention will be apparent from the following description of a presently preferred embodiment read in connection with the accompanying drawings, in which Fig. 1 is a fragmentary side elevation of the rear portion of a cooking range, the backsplasher being partly in section to show a preferred arrangement of a salt shaker receptacle embodying the invention; Fig. 2 is an enlarged vertical section of the receptacle and salt shaker therein; Fig. 3 is a fragmentary front elevation of the range backsplasher and front portion of the salt shaker, with the receptacle and lower portion of the shaker being in section on lines 3—3 of Fig. 2; Fig. 4 is a bottom plan view of the receptacle showing a typical disposition of the conductive material and terminal strips; Fig. 5 is a plan view of the connection block; and Fig. 6 is a vertical elevation of the connection block taken on lines 6—6 of Fig. 5.

A cooking range 1, which may be of any fuel type, has an upstanding wall or backsplasher 2 at the rear thereof. Usually, the backsplasher has a removable rear panel 3 which affords access to such devices as timing clocks, thermostats, etc. (not shown), which in modern range construction may be mounted on the backsplasher.

Pursuant to the present invention, I provide one or more openings in the front panel of the backsplasher to accommodate receptacles for salt and pepper shakers; preferably, said receptacles are relatively close together for convenient access. As indicated in Figs. 2 and 3, a backsplasher opening capable of receiving the salt shaker receptacle may be substantially rectangular with a short rearwardly directed flange 4 about its periphery. The flange may be continuous or interrupted at the corners or other places according to conventional manufacturing practice. An objective of the flange, as best appears in Fig. 2, is to serve as means to position a receptacle 5 for a salt shaker 6.

The receptacle is preferably molded from glass or other vitreous material, although it may be drawn from sheet metal and vitreous enamelled on its inner and outer surfaces. In any event, its front and side elevational configuration is such that it will telescope snugly over the flange 4 with its front edge in contact with the rear wall of the backsplasher.

Means are provided to apply heat to a wall of the receptacle. Although this might be done with any conventional electrical resistance element, substantial advantages accrue when the resistance material is in intimate contact with the bottom of the receptacle over a predetermined area thereof. Accordingly, there is applied over a suitable area of the receptacle a thin coating of an electrically conductive material, such as hydrated stannic chloride or hydrated stannous chloride. For a glass receptacle, a solution comprising one part of anhydrous stannic chloride in one part by volume of absolute alcohol mixed with one part by volume of distilled water is applied by spraying, brushing, or roller coating to the thoroughly cleaned and dried base of the receptacle. For vitreous enamelled metallic receptacles, the surface preparation for the reception of the solution will include pickling in a dilute sulphuric acid solution to remove all traces of metal from the surface of the vitreous enamel, followed by a thorough rinsing and drying. The thickness of the resultant coating 6 of the electrically conductive material is of the order of 16 millionths of an inch, providing a wattage density of 2.5 per sq. inch. For the reasonably large sized salt shakers with which ranges may be equipped, a total coated area of about 3 sq. inches is adequate.

I then apply contact strips 7 along the marginal edges thereof. This is conveniently done by striping said edges with metallic paint pursuant to present commercial practices in "printing" electric circuits on glass. The receptacle is then heated to a temperature of approximately 1100 degrees F. for several minutes, during which operation the stannic chloride becomes securely bonded to the glass as a metallic layer sufficiently hard to resist abrasion by any material incapable of scratching the glass itself. The majority of the vehicle of the silver striping material escapes during this baking stage and the metallic silver particles become electrically connected to the coating 6 to form suitable terminal strips.

For association with the receptacle, there is provided connection means having contact strips for connection to a power source; for example, 110 volts A. C. It is the intention that such electrical connections will be permanent; that is to say, there will be no switch by means of which the circuit may be interrupted. If desired, a suitable fuse (not shown) may be included in the circuit. As presently devised, the connector means comprises a block 8 of molded insulation material, such as a phenolic condensation product or equivalent, having its upper surface formed to provide a rather snug seat for the receptacle, as best appears in Figs. 2 and 3. It will also be noted that the engagement of the receptacle and connector block extends beyond the actual area of the coating 6. The receptacle is preferably formed with a pair of grooves 9 within each of which is located an upwardly bowed contact strip 10 of some springable material, such as spring brass or bronze. One end of each strip is fixed to the block 8; for example, I use rivets 11 having clips 12 to secure the conductors 14 which are soldered or otherwise electrically connected to the contact strips. As shown in Fig. 3, the spacing of the contact strips coincides with that of the terminal strips 7 of the receptacle. When the receptacle is secured in position on the block 8 the strips 10 tend to straighten out, thus engaging a substantial area of their associated terminal strips 7.

It will be apparent that the connector block 8 might be of vitreous material or at least have a vitreous coated upper surface, and that the electrical layer 6 and terminal strips 7 may be directly applied thereto, in which event the conductors 14 would be brazed or otherwise electrically connected to said terminal strips. As a practical matter, however, surface irregularities inevitable in mass production of the receptacles 5 or the blocks 8 might make it impossible to maintain good surface contact between the bottom of the receptacles and the electrically conductive coating on the base block with resultant loss in heat transfer efficiency. A further disadvantage of the heated connector block is the inevitable loss of heat by radiation from it, whereas the illustrated block has inherent thermal insulating properties.

A simple means for securing the receptacle and connector block to the range backsplasher is by the metal strap 15. To improve the engagement of the strap and terminal block, that block is formed with the notch 16 and rounded base portion 17 (see Figs. 5 and 6).

With the lower end of the straps secured to the backsplasher, the block 8 is set in position and the receptacle 5 placed on the block and in telescoping relation to the flange 4 as previously noted. The free end of the strap is then brought about the upper portion of the receptacle and suitably made fast to the backsplasher. When thus assembled the snug engagement of the connector block with substantially the entire bottom area of the receptacle, and its extent beyond the boundaries of the resistance coating 6, prevents heat loss by convection currents along the bottom of the receptacle. The material of the block 8 is itself a poor conductor of heat and the greater portion of the heat generated by the coating enters the wall of the receptacle.

The salt shaker itself may be of any desired pattern. As illustrated, it has a body part 18 conforming generally to the shape of the receptacle and an ornamental front wall 19 which preferably covers entirely the opening in the backsplasher. If desired, low runners 20 may be provided to raise the bottom of the salt shaker above the base of the receptacle and thus to provide clearance space for the removable filler plug 21. A pepper shaker (not shown) would be similarly constructed. Clearance between the walls of the shaker and the walls of the receptacle would provide an insulation space protecting the shaker against absorption of heat from its receptacle walls, if the latter were sufficiently close to the heated salt receptacle to be heated by radiation therefrom.

While there has been described what is at present considered to be the preferred embodiments of the invention, it will be understood that various modifications may be made therein, and it is intended to cover in the appended claims all such modifications as fall within the true spirit and scope of the invention.

I claim:

1. In a cooking range or the like, wall means having rearwardly directed flange portions defining an opening, a receptacle having wall means defining an access opening thereinto, said receptacle wall means being telescoped over said flange portions, an electrical resistance element in uniform intimate contact with a wall of said receptacle over a pre-established area of said wall, terminal strips in electrical contact with said resistance element, a connector block of electrically and thermally insulating material, contact elements on said connector block for electrical connection with said terminal strips, means for connecting said contact elements to a source of electrical energy, and means for securing said connector block in intimate relation to said receptacle wall with the respective terminals and contacts in electrical connection, said means also forming means for securing said receptacle to said range wall.

2. In a cooking range or the like, wall means having an opening, a receptacle having wall means defining an access opening thereinto, said receptacle wall means being disposed about said first-named opening, an electrical resistance element in uniform intimate contact with a wall of said receptacle over a pre-established area of said wall, terminal strips in electrical contact with said resistance element, a connector block of electrically and thermally insulating material, contact elements on said connector block for electrical connection with said terminal strips, means for connecting said contact elements to a source of electrical energy, and means for securing said connector block in intimate relation to said receptacle wall with the respective terminals and contacts in electrical connection.

3. In combination, a receptacle having a wall of vitreous material, a thin, homogeneous, layer of electrically conductive material in intimate contact with a predetermined area of said wall, terminal strips along opposed marginal edges of said electrically conductive area, a connector block of electrically insulating material formed for snug engagement with said wall over and beyond the area of said layer, resilient contact strips on said block for engagement with said terminal strips, means for connecting said contact strips to a source of electrical energy, and means for securing said connection block to said receptacle with the respective terminal strips and contact strips in electrically conductive relationship.

4. In combination, a receptacle, electrical resistance means in uniformly intimate contact over a predetermined area of a wall thereof, terminals for said resistance means, a connector block of insulation material, said block being configurated to snugly receive the said receptacle wall over substantially its entire area, contact means on said connector block engaging said resistance means terminals, means for connecting said contact means to a source of electrical energy, and means for clamping said receptacle to said connector block to maintain the contact means and terminals in close electrically conductive relationship.

5. In combination, a receptacle, electrical resistance means in uniformly intimate contact with an area less than the total area of a wall thereof, terminals for said resistance means, a connector block of insulation material, said block being configurated to snugly receive the said receptacle wall over substantially its entire area, contact means on said connector block engaging said resistance means terminals, means for connecting said contact means to a source of electrical energy, and means for clamping said receptacle to said connector block to maintain the contact means and terminals in close electrically conductive relationship.

DOUGLAS W. QUIRK.

References Cited in the file of this patent

UNITED STATES PATENTS

| Number | Name | Date |
|---|---|---|
| 1,973,347 | Kelly | Sept. 11, 1934 |
| 1,978,089 | Jones | Oct. 23, 1934 |
| 1,993,330 | Latiolais | Mar. 5, 1935 |
| 2,005,501 | Kelly | June 18, 1935 |
| 2,299,401 | Melton | Oct. 20, 1942 |
| 2,360,691 | Kuhn et al. | Oct. 17, 1944 |
| 2,398,939 | Horn | Apr. 23, 1946 |
| 2,495,788 | Trist | Jan. 31, 1950 |
| 2,564,706 | Mochel | Aug. 21, 1951 |
| 2,571,218 | Del Buttero | Oct. 16, 1951 |
| 2,572,163 | Lamb | Oct. 23, 1951 |
| 2,577,327 | Hill | Dec. 4, 1951 |